Aug. 28, 1962     L. D. PITTS     3,050,897
FISHING GIG WITH ATTACHABLE STRING LINE
Filed Sept. 22, 1960
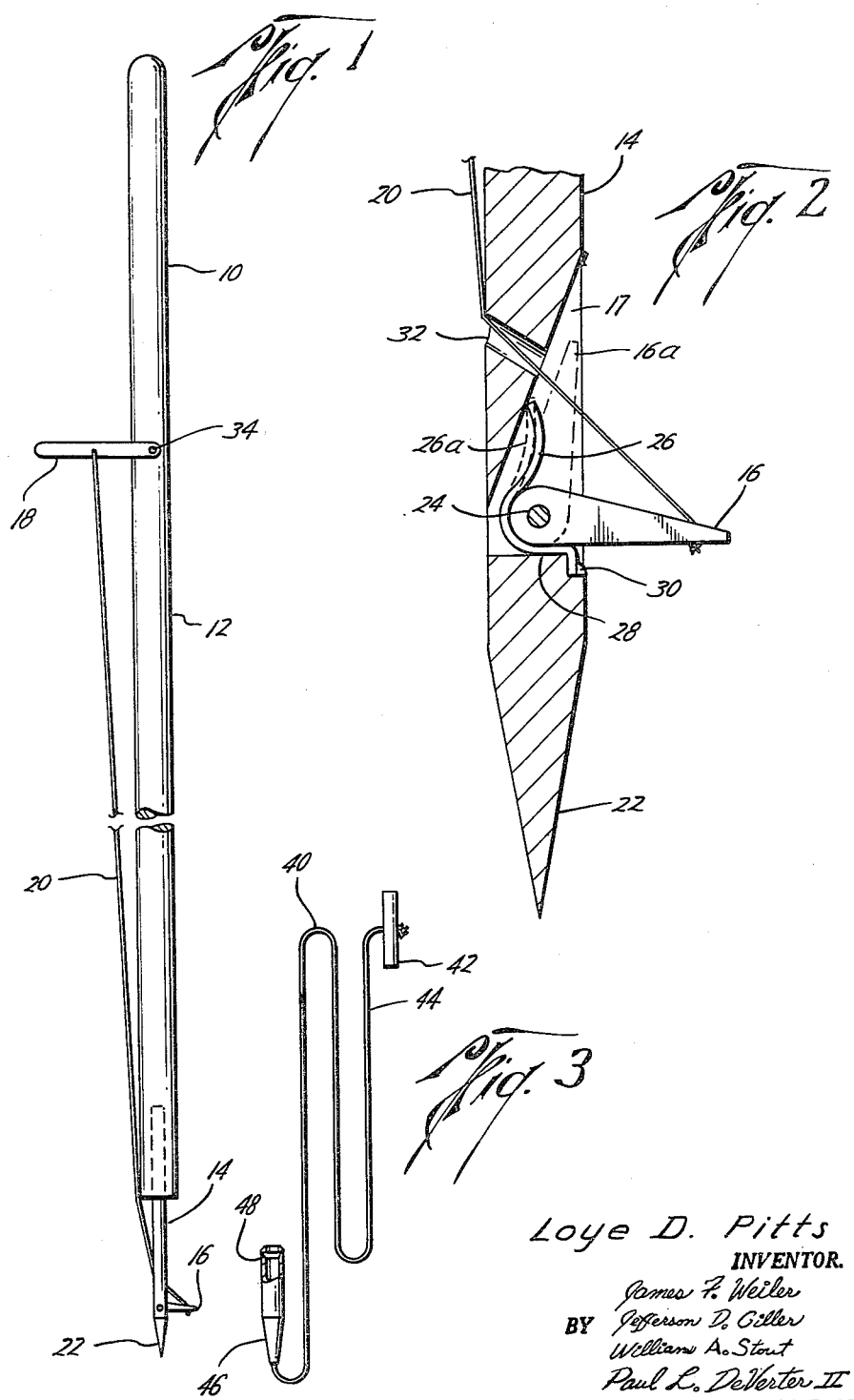

United States Patent Office 3,050,897
Patented Aug. 28, 1962

3,050,897
FISHING GIG WITH ATTACHABLE STRING LINE
Loye D. Pitts, 231 Cayton St., Houston, Tex.
Filed Sept. 22, 1960, Ser. No. 57,674
3 Claims. (Cl. 43—6)

The present invention relates to an improved fishing gig for use in restraining caught fish and the like, and more specifically to a fishing gig having a retractable barb thereon.

Previously, fishing gigs or gaffs have been provided having manually retractable barbs thereon. However, to retract these barbs it is necessary to reach around the caught fish and manipulate the barb at the spear or pointed end of the gig. Not only is this inconvenient, but also inefficient, and depending upon the type of fish which has been caught, perhaps dangerous.

The present invention overcomes these objections by providing an improved fishing gig having a retractable barb with means to remotely retract the barb and thereby release the caught fish. The barb is yieldingly mounted on the gig so that when the fishing gig is plunged through a fish, the barb automatically retracts and then springs into its operative position until remotely retracted so that the fish may be released.

It is therefore an object of the present invention to provide an improved fishing gig having a yieldingly mounted barb which will retract automatically when the gig is plunged through a fish and will then automatically spring outwardly to retain the caught fish.

Another object of the present invention is to provide an improved fishing gig having a retractable barb which is remotely retractable to release a caught fish.

Still another object of the present invention is to provide an improved fishing gig having a retractable spring loaded pivoted barb which is remotely releasable.

Another object of the present invention is to provide an improved fishing gig having a retractable barb which is automatically retracted when a string line is attached to the gig.

A further object of the present invention is to provide a string line which is easily attachable to a retractably barbed fishing gig so that a caught fish may be slid directly from the gig to the string line without the fisherman physically contacting or touching the caught fish.

Other and further objects, features and advantages will be apparent from the following description of the presently preferred embodiment of the invention, given for the purpose of disclosure, and taken in conjunction with the accompanying drawings, where like character references designate like parts throughout the several views, and where FIGURE 1 is a side view of a presently preferred embodiment of the invention, FIGURE 2 is a partial sectional view of the end of the gig and showing the movement of the barb, and FIGURE 3 is a view, partially in section, of a string line which may be used with the present invention.

In this preferred embodiment, the invention includes essentially a pivoted barb mounted in a recess in the spike of a fishing gig, which barb is urged outwardly by a spring, and which may be remotely retracted by tensioning a cord or other flexible means. The invention also includes a string line terminating in a hollow cap which may be slipped over the retractably barbed spike.

Referring now to the drawings, the reference numeral 10 generally designates a fishing gig having a handle 12 with a shaft or spike 14 embedded within the handle 12, a barb 16, a lever 18, and a flexible tensioning means, such as the cord 20 connecting the barb 16 and lever 18.

The handle is a long pole, typically of wood, but it may also be made of plastic or metal. At one end of the handle 12 a spike 14 is affixed. The spike 14 has a sharp point 22 so that it may be easily plunged through a fish. The handle 12 and spike 14 are conventional, and no further explanation thereof is deemed necessary.

Referring now to FIGURE 2, where an enlarged sectional view of the spike 14 is shown, it is seen that the barb 16 is pivotably mounted to the spike 14 in a recess 17 therein. The pivotal mounting depicted herein is a pin 24 although a rivet or other conventional pivoting means may be used. Attached to the spike 14 is a spring 26 which yieldingly urges the barb 16 outwardly. To be most effective the spring 26 is so curved that it will urge the barb 16 outwardly, yet will prevent the barb from pivoting past an essentially perpendicular relationship with the spike 14. The spring 26 is here shown as a leaf spring which is in contact with other components at three points along its length, thereby assuring stability. The spring 26, at each end thereof, presses against the recess 17 in the spike 14, and along its course, presses against the barb 16 to urge it outwardly. To prevent the barb 16 from being urged too far, or to prevent a caught fish from pivoting the barb 16 past a perpendicular relationship with the spike 14, the recess 17 and spring 26 are desiged with an abutment 28 to limit the pivotal movement of the barb 16. In addition to depending upon the particular shape or curvature of the spring 26 as flexed to retain itself within the recess 17, it may also be conventionally attached to the spike 14, as with a rivet not shown, or spot welding as at 30. It is, of course, possible that the leaf spring 26 may be replaced with a coil spring or other conventional yieldingly urging means so that the barb 16 is urged outwardly and abutted or stopped in perpendicular relationship with the spike 14.

A flexible tensioning means is attached to the barb 16 and run through a hole 32 in the spike 14 communicating with the recess 17 and then along the handle 12 as will be hereinafter described. The hole 32 is positioned so that the barb 16a may be fully retracted into the recess 17. The flexible tensioning means is here shown as a cord 20, although other devices may be utilized, such as a flexible wire cable, soft wire, or string, none of which being shown.

Referring again to FIGURE 1, it is seen that the cord 20 is attached to the lever 18. The lever 18 is pivotally mounted on the handle 12 by means of a pin 34, although here again other pivoting means may be utilized, such as a nail or rivet.

When it is desired to retract the barb 16 into the recess 17 within the spike 14, then the handle 18 is pivoted about the pin 34, tensioning the cord 20, and pulling the barb 16 into the recess, and overcoming the spring 26. Referring again to FIGURE 2, when the barb 16 is retracted, it is shown in dotted lines as 16a, while the overcome spring 26 is shown as 26a. It is to be noted that the recess 17 extends completely through the spike 14 and the reason is that if in use, mud or other debris clogs the spring 26, barb 16 and cord 20 operation, then the spike 14 may be swished through the water and the mud is rapidly removed by the water passing through the recess 17.

Conventionally, after a fish has been caught it is placed in a receptacle, such as a basket, or upon a string line so that the fishing equipment is again available for further fishing.

Referring now to FIGURE 3, a string line 40 is shown which is particularly adapted for use within the present fishing gig 10. The string line 40 generally includes a handle 42, a string 44 attached to the handle 42, and a cap 46 attached to the remaining end of the string 44. The cap 46 is hollow so that it may be inserted over the spike 14 and the recess 17 when the barb 16 is retracted into the position 16a. By forcing the cap 46 onto the spike 14, the barb 16 is automatically retracted.

To releasably secure the cap 46 on the spike 14, an internal shoulder 48 is provided within the cap 46. When the barb 16 is retracted into the position 16a, the shoulder 48 will pass the end of the barb 16a. If the cap 46 is moved downwardly, the barb 16a will catch in the shoulder 48, preventing further movement. To release the cap 46, the cord 20 need only be tensioned to retract the end of the barb 16a.

In use, as when floundering, the handle 12 of the fishing gig 10 is grasped, and the sharp point 22 and spike 14 are plunged through the fish. In so doing, the fish pushes against the yieldingly urged outwardly barb 16 and overcomes the spring 26, so that the barb 16 is momentarily retracted as at 16a and the fish passes therebeyond without damage to other parts of its flesh. After the fish has passed the end of the barb 16a, the overcome spring 26a again urges the barb 16a outwardly, and the descending caught fish presses the barb against the spring 26 and abutment 28. Thereupon, the fishing gig 10 may be lifted upwardly out of the water, and the fish which is caught on the spike 14 may slide downwardly but will not pass the barb 16.

When it is desired to remove a caught fish from the spike 14, and, for example, to place it into a basket, then the lever 18 is pulled, tensioning the cord 20 and retracting the barb 16 by overcoming the spring 26 until the barb is in the position 16a. Thereupon, the fish will slide downwardly along the spike 14 and over the point 22 into the basket. If, however, it is desired to place the caught fish on the string line 40, then the cap 46 is inserted over the point 22 and pushed against the barb 16 so that it retracts into the position 16a. Then the caught fish may be slid down the spike 14 over the cap 46 and on to the string 44 where it will be retained by the handle 42.

It is thus seen that the present invention may be used to releasably secure caught fish, and that the fish may be easily and remotely detached from the fishing gig 10. Although the present invention has been particularly described with reference to fish, it is obvious that many other animals and objects may be likewise caught and remotely released, such as frogs and turtles, or the present invention may be adapted to use with underwater spear gun devices. If an economy model is desired, then the lever 18 may be eliminated and the barb retracted by pulling the cord 20.

The present invention, therefore, is well adapted to carry out the objects and attain the advantages mentioned as well as others inherent therein. While a presently preferred embodiment of the invention is given for the purpose of disclosure, numerous changes in the details of construction and the combination, shape, size and arrangement of parts may be resorted to without departing from the spirit of the scope of the invention as hereinafter claimed.

What is claimed is:

1. In a fishing gig, a handle, a spike mounted on said handle, said spike having a recess, a retractable barb having first and second ends, the first end of said barb being pivotably mounted in said recess, a spring yieldingly urging said barb outwardly, an abutment adjacent said barb and positioned to limit outward movement of said barb, a hollow cap slidable over said spike and said barb thereby retracting said barb within said recess, said cap having an internal shoulder engageable with the second end of said barb, and a stringline attached to said cap.

2. The invention of claim 1 including a passageway extending from said recess adjacent the second end of the barb when retracted, and a cord passing through said passageway operatively connected to the barb whereby the barb may be remotely retracted into the recess when the cord is actuated.

3. The invention of claim 2 including a lever pivotably mounted on said handle and operatively connected to the cord.

References Cited in the file of this patent
UNITED STATES PATENTS

| | | |
|---|---|---|
| 1,302,457 | Ureck | Apr. 29, 1919 |
| 1,334,206 | Wood | Mar. 16, 1920 |
| 2,217,928 | Ward | Oct. 15, 1940 |
| 2,758,405 | Hertel | Aug. 14, 1956 |

FOREIGN PATENTS

| | | |
|---|---|---|
| 456,998 | Canada | May 31, 1949 |